3,816,391
2-AMINO-4-ARYL-5-(2 - CYANO - 4,6 - DINITRO-PHENYLAZO)THIAZOLE COMPOUNDS
Clarence A. Coates, Jr., and Max A. Weaver, Kingsport, Tenn., assignors to Eastman Kodak Company, Rochester, N.Y.
No Drawing. Filed Dec. 1, 1971, Ser. No. 203,823
Int. Cl. C09b 29/36; D06p 3/52
U.S. Cl. 260—158                             8 Claims

ABSTRACT OF THE DISCLOSURE

Monoazo compounds having a 2-cyano-4,6-dinitrophenyl diazo component and a 2-amino-4-aryl-5-thiazolyl coupling component produce blue to green shades on polyester textile materials and exhibit good fastness and dyeability properties.

---

This invention concerns novel azo compounds which conform to the general formula (I) 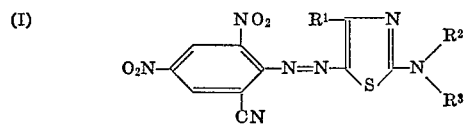

wherein $R^1$ is lower alkyl, cyclohexyl, lower alkylcyclohexyl, aryl or lower alkyl substituted with aryl;
$R^2$ individually is hydrogen or any of the groups which $R^1$ can represent;
$R^3$ individually is lower alkyl; lower alkyl substituted with halogen, hydroxy or lower alkanoyloxy; allyl; or, when $R^2$ is a group which $R^1$ can represent, $R^3$ also can be hydrogen; and
$R^2$ and $R^3$ collectively are pentamethylene or ethyleneoxyethylene;

in which each aryl group is phenyl or phenyl substituted with lower alkyl, lower hydroxyalkyl, lower alkoxy, hydroxy, halogen, cyclohexoxy, cyclohexylmethyl lower alkanoylamino, nitro or lower alkoxycarbonyl.

The azo compounds of the invention produce bright blue to green shades on polyester textile materials when applied thereto by conventional disperse dyeing procedures. In addition to the desirable blue and unique green shades produced by our compounds, they also exhibit an excellent combination of properties including good dyeability, fastness to light and resistance to sublimation.

The substituents represented by $R^1$, $R^2$ and $R^3$ are well known to those skilled in the art and can be derived from commercially available or readily obtainable intermediates. Chlorine and bromine are preferred halogen atoms which can be present on the azo compounds. We also prefer that the aryl groups represented by $R^1$ and $R^2$ do not contain more than one substituent. As used herein to describe an alkyl moiety, "lower" designates a carbon content of one to about four carbon atoms.

A group of our novel compounds which, because of their cost:performance ratio, are particularly preferred are those of formula (I) in which $R^1$ is phenyl, tolyl, lower alkoxyphenyl or lower alkanoylaminophenyl; $R^2$ is lower alkyl, cyclohexyl, phenyl, tolyl or lower alkoxyphenyl; and $R^3$ is hydrogen or lower alkyl.

Our novel compounds are prepared by diazotizing 2-cyano-4,6-dinitroaniline and coupling the resulting diazonium salt with a coupler having the formula (II) 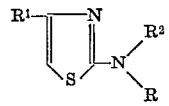

The 2-aminothiazole couplers are prepared by known methods, e.g., those disclosed in French Pat. 1,600,940.

The following examples will further illustrate our novel azo compounds and their preparation.

EXAMPLES 1–10

To 140 ml. of 70% $H_2SO_4$ is added 8.32 g. (0.4 m.) of 2-cyano-4,6-dinitroaniline. The slurry is stirred at 15° C. for 15 minutes and then cooled to −2° C. A solution of 3.0 g. $NaNO_2$ in 20 ml. conc. $H_2SO_4$ is added portionwise, keeping the temperature below 0° C. The diazotization reaction is stirred at 0° C. for 2 hours. The following couplers (.005 mole each) are dissolved in 25 ml. portions of 1:5 acid (1 part acetic acid:5 parts propionic acid) and the solutions cooled in an ice bath:

Example 1—2-Dimethylamino-4-phenylthiazole
Example 2—2-Dimethylamino-4-(p-methoxyphenyl) thiazole
Example 3—2-(N-Ethyl-N-phenylamino)-4-phenylthiazole
Example 4—2-(N-Methyl-N-phenylamino)-4-phenylthiazole
Example 5—2-(N-Methyl-N-phenylamino)-4-(p-methoxyphenyl)thiazole
Example 6—2-Phenylamino-4-phenylthiazole
Example 7—2-(p-Methoxyphenylamino)-4-phenylthiazole
Example 8—2-Di-n-propylamino-4-(p-methoxyphenyl) thiazole To each chilled coupler solution is added .005 mole of the diazotized amine. After coupling for 15 minutes, the azo products are precipitated by drowning with water, collected by filtration, washed with water and air dried. The azo compounds are purified by slurrying in hot methanol or ethanol, followed by cooling and filtering. The azo compounds of Examples 2, 5 and 8 produce green shades when applied to polyester fibers. The other examples produce bright neutral blue shades having excellent lightfastness and resistance to sublimation.

The azo compounds set forth in the following Table conform to formula (I). Table Examples 1–8 describe the azo compounds prepared in the preceding examples. The remainder of the compounds described in the Table are prepared by the procedures set forth hereinabove. The color given for each of the azo compounds refers to the shade it produces on polyester fibers.

TABLE

| Example No. | $R^1$ | $R^2$ | $R^3$ | Color |
|---|---|---|---|---|
| 1 | —$C_6H_5$ | —$CH_3$ | —$CH_3$ | Blue. |
| 2 | —$C_6H_4$-p-$OCH_3$ | —$CH_3$ | —$CH_3$ | Green. |
| 3 | —$C_6H_5$ | —$C_6H_5$ | —$C_2H_5$ | Blue. |
| 4 | —$C_6H_5$ | —$C_6H_5$ | —$CH_3$ | Do. |
| 5 | —$C_6H_4$-p-$OCH_3$ | —$C_6H_5$ | —$CH_3$ | Green. |
| 6 | —$C_6H_5$ | —$C_6H_5$ | H | Blue. |
| 7 | —$C_6H_5$ | —$C_6H_4$-p-$OCH_3$ | H | Do. |
| 8 | —$C_6H_4$-p-$OCH_3$ | —$CH_2CH_2CH_3$ | —$CH_2CH_2CH_3$ | Green. |
| 9 | —$C_6H_5$ | —$CH(CH_3)C_2H_5$ | H | Blue. |
| 10 | —$C_6H_5$ | —$C_6H_{11}$ | H | Do. |
| 11 | —$C_6H_4$-p-$CH_3$ | —$C_6H_{11}$ | —$C_2H_5$ | Do. |
| 12 | —$C_6H_4$-p-Cl | —$CH_3$ | —$CH_3$ | Do. |

TABLE—Continued

| Example No. | R¹ | R² | R³ | Color |
|---|---|---|---|---|
| 13 | —$C_6H_4$-m-Cl | —$C_6H_4$-p-NHCOCH$_3$ | —CH$_3$ | Do. |
| 14 | —$C_6H_4$-o-Cl | —$C_6H_4$-p-CH$_3$ | —CH$_3$ | Do. |
| 15 | —$C_6H_4$-p-Br | —$C_6H_4$-m-CH$_3$ | —CH$_3$ | Do. |
| 16 | —$C_6H_4$-p-NO$_2$ | —$C_6H_4$-m-CH$_3$ | —CH$_3$ | Do. |
| 17 | —$C_6H_{11}$ | —CH$_3$ | —CH$_3$ | Do. |
| 18 | —CH$_2$C$_6$H$_5$ | —CH$_3$ | —CH$_3$ | Do. |
| 19 | —CH$_3$ | —C$_6$H$_5$ | —C$_2$H$_5$ | Do. |
| 20 | —C$_2$H$_5$ | —C$_6$H$_5$ | —C$_2$H$_5$ | Do. |
| 21 | —C$_6$H$_5$ | —C$_6$H$_5$ | —CH$_2$CH=CH$_2$ | Do. |
| 22 | —C$_6$H$_5$ | —C$_6$H$_5$ | —CH$_2$CH$_2$OH | Do. |
| 23 | —C$_6$H$_5$ | —CH$_2$CH$_2$—O—CH$_2$CH$_2$— | | Do. |
| 24 | —C$_6$H$_5$ | —CH$_2$CH$_2$CH$_2$CH$_2$— | | Do. |
| 25 | —C$_6$H$_5$ | —CH$_2$C$_6$H$_5$ | —C$_2$H$_5$ | Do. |
| 26 | —C$_6$H$_4$-p-OCH$_3$ | —C$_6$H$_5$ | —C$_2$H$_5$ | Green. |
| 27 | —C$_6$H$_4$-p-OCH$_3$ | —C$_6$H$_5$ | —CH$_2$CH$_2$OOCCH$_3$ | Do. |
| 28 | —C$_6$H$_4$-p-OCH$_3$ | —(CH$_2$)$_3$CH$_3$ | —(CH$_2$)$_3$CH$_3$ | Do. |
| 29 | —C$_6$H$_4$-p-OCH$_3$ | —C$_6$H$_{11}$ | H | Do. |
| 30 | —C$_6$H$_4$-p-OCH$_3$ | —CH(CH$_3$)$_2$ | H | Do. |
| 31 | —C$_6$H$_4$-p-OH | —C$_6$H$_5$ | —C$_2$H$_5$ | Do. |
| 32 | —C$_6$H$_4$-p-OH | —CH$_3$ | —CH$_3$ | Do. |
| 33 | —C$_6$H$_4$-p-OC$_2$H$_5$ | —CH$_3$ | —CH$_3$ | Do. |
| 34 | —C$_6$H$_4$-p-OCH$_2$CH(CH$_3$)$_2$ | —CH$_3$ | —CH$_3$ | Do. |
| 35 | —C$_6$H$_4$-p-OC$_6$H$_{11}$ | —CH$_3$ | —CH$_3$ | Do. |
| 36 | —C$_6$H$_4$-p-CH$_2$C$_6$H$_{11}$ | —CH$_3$ | —CH$_3$ | Do. |
| 37 | —C$_6$H$_4$-p-CH$_3$ | —C$_6$H$_5$ | H | Blue. |
| 38 | —C$_6$H$_5$ | —C$_6$H$_3$-o,p-di-CH$_3$ | H | Do. |
| 39 | —C$_6$H$_5$ | —C$_6$H$_4$-o-Cl | H | D·. |
| 40 | —C$_6$H$_5$ | —C$_6$H$_3$-o,m-di-Cl | H | Do. |
| 41 | —C$_6$H$_5$ | —C$_6$H$_4$-p-Cl | H | Do. |
| 42 | —C$_6$H$_5$ | —C$_6$H$_4$-m-CH$_3$ | H | Do. |
| 43 | —C$_6$H$_5$ | —C$_6$H$_4$-o-OCH$_3$ | H | Do. |
| 44 | —C$_6$H$_4$-p-OCH$_3$ | —C$_6$H$_4$-o-CH$_3$ | H | Green. |
| 45 | —C$_6$H$_4$-p-OCH$_3$ | —C$_6$H$_4$-m-CH$_3$ | H | Do. |
| 46 | —C$_6$H$_5$ | H | —CH$_2$CH=CH$_2$ | Blue. |
| 47 | —C$_6$H$_4$-p-OCH$_3$ | —C$_6$H$_5$ | —C$_2$H$_5$ | Green. |
| 48 | —C$_6$H$_5$ | —CH$_2$C$_6$H$_5$ | H | Blue. |
| 49 | —C$_6$H$_4$-p-OCH$_3$ | —C$_6$H$_5$ | —C$_2$H$_5$ | Green. |
| 50 | —C$_6$H$_5$ | —C$_6$H$_4$-p-CH$_3$ | —CH$_3$ | Blue. |
| 51 | —C$_6$H$_5$ | —CH$_2$CH$_2$C$_6$H$_5$ | H | Do. |
| 52 | —C$_6$H$_5$ | —CH$_3$ | H | Do. |
| 53 | —C$_6$H$_5$ | —C$_6$H$_4$-p-CH$_2$CH$_2$OH | H | Do. |
| 54 | —C$_6$H$_4$-p-NHCOCH$_3$ | —C$_6$H$_5$ | —C$_2$H$_5$ | Green. |
| 55 | —C$_6$H$_5$ | —C$_6$H$_4$-p-CH$_3$ | H | Blue. |
| 56 | —C$_6$H$_5$ | —C$_6$H$_4$-m-NHCOCH$_3$ | H | Dl. |
| 57 | —C$_6$H$_5$ | —C$_6$H$_4$-o-CH$_3$ | H | Do. |
| 58 | —C$_6$H$_5$ | —C$_6$H$_4$-m-F | H | Do. |
| 59 | —C$_6$H$_5$ | —C$_6$H$_4$-m-CH$_3$ | —C$_2$H$_5$ | Do. |
| 60 | —C$_6$H$_5$ | —C$_6$H$_4$-m-OCH$_3$ | H | Do. |
| 61 | —C$_6$H$_5$ | —CH$_2$C$_6$H$_5$ | —C$_2$H$_5$ | Do. |

Our novel compounds can be applied to polyester fibers, yarns and fabric according to known procedures such as those described in French Pat. 2,008,404.

The invention has been described in considerable detail with particular reference to certain preferred embodiments thereof, but it will be understood that variations and modifications can be effected within the spirit and scope of the invention.

We claim:

1. A compound having the formula

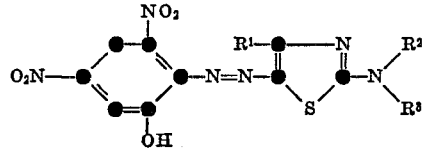

wherein R¹ is phenyl, tolyl, lower alkoxyphenyl or lower alkanoylaminophenyl; R² is lower alkyl, cyclohexyl, phenyl, tolyl or lower alkoxyphenyl; and R³ is hydrogen or lower alkyl.

2. A compound according to claim 1 having the formula

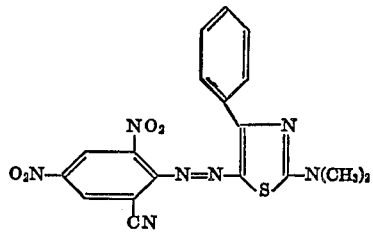

3. A compound according to claim 1 having the formula

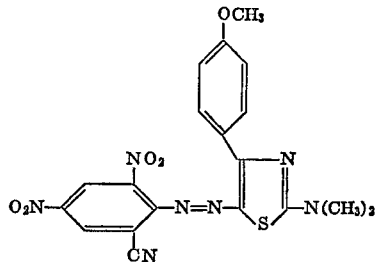

4. A compound according to claim 1 having the formula

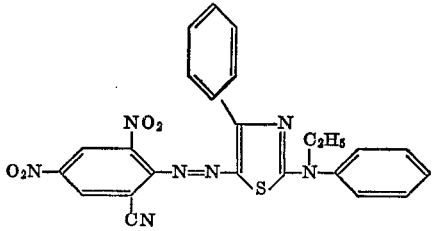

5. A compound according to claim 1 having the formula

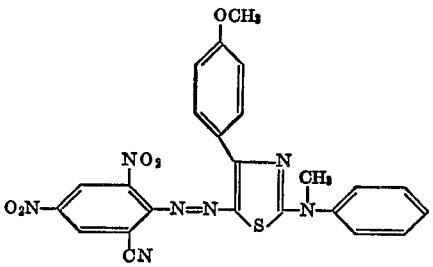

6. A compound according to claim 1 having the formula
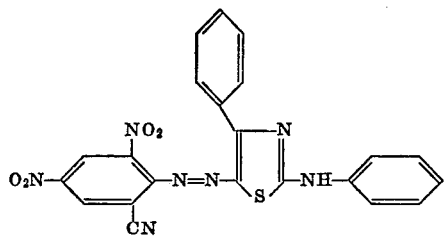
7. A compound according to claim 1 having the formula
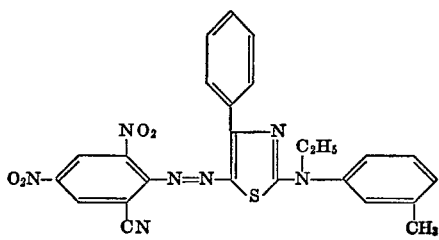
8. A compound according to claim 1 having the formula
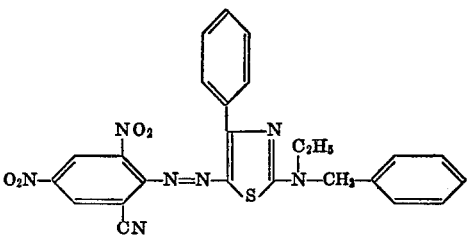
References Cited
UNITED STATES PATENTS
2,746,953  5/1966  Dickey et al. _____ 260—158
3,324,105  6/1967  Hanke et al. _____ 260—158
OTHER REFERENCES
Beyer et al., Gesell Ber. Deut. Chem., volume 85, pp. 1077–1083 (1952).
FLOYD DALE HIGEL, Primary Examiner
U.S. Cl. X.R.
260—302 R